United States Patent [19]
Waddell

[11] Patent Number: 4,822,155
[45] Date of Patent: Apr. 18, 1989

[54] MIRROR ASSEMBLY WITH FLEXIBLE MEMBRANE

[75] Inventor: Peter Waddell, East Kilbride, Scotland

[73] Assignee: University of Strathclyde, Glasgow, Scotland

[21] Appl. No.: 192,788

[22] PCT Filed: Sep. 4, 1987

[86] PCT No.: PCT/GB87/00622
§ 371 Date: Apr. 28, 1988
§ 102(e) Date: Apr. 28, 1988

[87] PCT Pub. No.: WO88/02126
PCT Pub. Date: Mar. 24, 1988

[30] Foreign Application Priority Data

Sep. 18, 1986 [GB] United Kingdom ............... 8622515

[51] Int. Cl.⁴ .................. G02B 7/18; G02B 5/10; G02B 5/08
[52] U.S. Cl. .................................................. 350/608
[58] Field of Search ........................... 350/608, 607

[56] References Cited

U.S. PATENT DOCUMENTS 1,060,447  4/1913  Geisler ............................. 350/608

FOREIGN PATENT DOCUMENTS 991898  6/1976  Canada ............................. 350/608
152268  8/1985  European Pat. Off. .
2631551  2/1978  Fed. Rep. of Germany ...... 350/608
380473  9/1932  United Kingdom ............... 350/608

Primary Examiner—Jon W. Henry
Attorney, Agent, or Firm—Bell, Seltzer, Park & Gibson

[57] ABSTRACT

A flexible mirror (10) comprising a reflectively coated membrane (12) overlying a circular chamber (14) has its membrane (12) tension controlled around the membrane periphery. The membrane periphery is secured by circularly-extending clamp surfaces formed between two rings (21, 24) which are axially movably mounted by three bolts (22) and associated springs (23) which provide for coarse tension control when the membrane (12) is pulled down against the circular aperture (13) of structure (15). Fine tension control is provided by one ring (24) containing a segmented inner ring (32) the segments of which are independently operated by bolts (33) causing the segments to abut an O-ring (30) overlying membrane (12) and squashing the membrane (12) to a greater or less extent into an annular groove or channel (31) formed in the ring (21). The effectiveness of the tension control is monitored interferometrically.

5 Claims, 1 Drawing Sheet

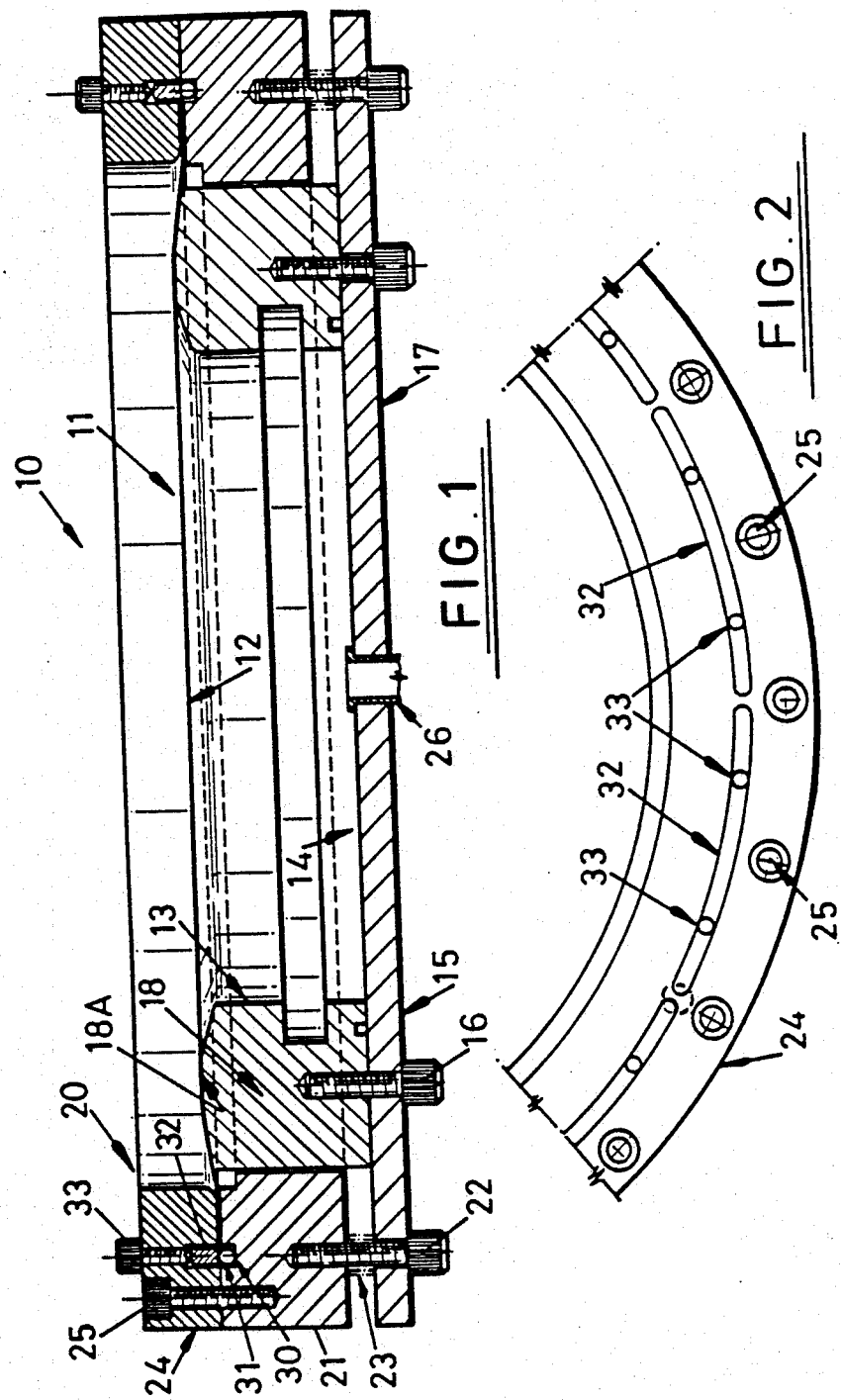

MIRROR ASSEMBLY WITH FLEXIBLE MEMBRANE

This invention relates to mirror assemblies.

Mirrors are well known optical components having a large variety of uses and variable focal length mirrors have previously been proposed utilising a thin flexible carrier having a reflective surface, the carrier with its reflective surface being displaced from planar by suction. Particular forms of such mirror assemblies and which are characterised by good image forming characteristics are disclosed in European Patent Publication No. 0152268.

It is an object of the present invention to provide an improved form of mirror assembly.

According to the present invention there is provided a mirror assembly comprising a rigid circular structure defining a hollow chamber having a circular aperture, a flexible membrane disposed across said circular aperture and in contact with the periphery of the circular aperture, said flexible membrane having a reflective coating adherent to the membrane face which is distal to said circular aperture, circularly-extending secural means peripherally engaging said membrane radially outwardly of said circular aperture and capable of rendering flat that portion of the membrane covering said circular aperture, pneumatic means connected to said chamber for varying the differential pneumatic pressure across the membrane to thereby apply a pneumatic membrane deformation force to the membrane, said reflective coating being rendered variable in focal length according to the magnitude of the applied deformation force, said secural means providing peripherally continuous clamping of the membrane between opposed circularly-extending clamp surfaces at least one of which is mounted for movement axially of said circular structure in order to effect rendering said membrane portion flat in the absence of and deformation force applied by said pneumatic means, said secural means including peripherally-discontinuous adjustment means for adjusting the tension in individual peripheral regions of said membrane portion, and stress control means located at the interface between the circular structure and the reflective coating for controlling the stress distribution in the membrane around the periphery of the circular aperture when deformation force is applied by said pneumatic means.

An embodiment of the present invention will now be described by way of example with reference to the accompanying drawings, in which:

FIG. 1 is a sectional view of the embodiment; and

FIG. 2 is a plan view of a portion of the FIG. 1 embodiment.

In the drawings, mirror assembly 10 is formed by a reflective coating 11 on one surface of a flexible substrate 12 which overlies a circular aperture 13 at the open end of a hollow chamber 14 formed by a circular structure 15. The structure 15 comprises a radially thick ring wall 18 which is secured by a plurality of bolts 16 to a rigid base plate 17 and provision is made at the interface for a plastic O-ring to effect a pneumatic seal. Base plate 17 is of greater diameter than the ring wall 18 and the annular skirt thereby provided, supports a circularly-extending secural means 20 for peripherally engaging the membrane 12 radially outwardly of the circular aperture 13.

Secural means 20 comprises a lower ring element 21 which is resiliently secured to base plate 17 by three equi-angularly spaced bolts 22 to provide a three-point mounting, each bolt being surrounded by a spring 23. With this arrangement adjustment of the plane of element 21 is easily effected without introducing distortion of the ring element into a non-planar condition. A second ring element 24 is secured to the first ring element 21 by means of a plurality of bolts 25. Bolts 25 may be twenty-four in number and the abutting surfaces of ring elements 21, 24, are substantially planar and provide peripherally continuous clamping of the membrane 12 between opposed circularly-extending clamp surfaces. Because of bolts 22 and springs 23 both of these surfaces are capable of movement axially with respect to the circular structure 15 for the purpose of rendering the central portion of the membrane flat by tensioning it over the end face of structure 15 in the absence of any deformation force applied to the membrane 12 by means of differential pneumatic pressure. Variation in this differential pressure is effected by applying suction to the interior of chamber 13 by means of a vacuum source applied to nipple 26 mounted in base plate 17.

For the purpose of providing selective localised tension control in membrane 12 around the circular periphery of the membrane 12 the secural means 20 incorporates an O-ring 30 which overlies membrane 12 and forces the membranes at least partly into an annular groove 31 formed in ring element 21. O-ring 30 is forced into groove 31 by a segmented ring 32 abutting bolts 33, both of which are mounted in ring 24. It is preferred that ring 32 has twelve segments each of which is associated with two bolts 33 and it will be appreciated that by varying the penetration of each pair of bolts 33 into ring 24 the associated segment of ring 32 is forced against O-ring 30 to squash O-ring 30 to a greater or lesser extent into groove 31 and this provides for localised tension control of the membrane 12.

For the purpose of providing membrane stress control at the interface between the circular structure 13 and the reflective coating 11 in this construction the circular ring wall 18 is both radially broad and has its end face 18A profiled into a slightly convex form in order to provide a radially smooth contour which is circularly symmetric for the membrane 12. The radially broad nature of the wall 18 prevents vacuum leaks, the mirror can be held at any one curvature to interferometric accuracy (as proved by interferometric testing), no continuously running vacuum pump is required and the forces between wall 18 and membrane 12 are always small. If ring wall 18 is not radially broad the forces imposed by it on membrane 12 becomes large and membrane 12 experiences very large forces which will permanently crease the membrane 12 and cause large localised non-symmetric stretch therein, both of which result in non-symmetrical mirrors giving rise to poor imaging or no imaging at all.

By way of example it is preferred that ring wall 18 have a radial thickness of about 2 inches (50 mm) with a convex profile of maximum amplitude in the range 1/16th to ⅛th inches (2–4 mm) and that the diameter of the chamber 13 be about 8 inches (200 mm) and that the membrane 12, together with its reflective coating 11, has a thickness of 125 microns. With this arrangement the contact radial width between the membrane and the ring wall is very many times greater than the thickness of the membrane being, in this example, in the same order of magnitude as the radius of the chamber 14, and is sufficiently large as to maintain stress concentrations in the membrane 12, when the latter is deformed to its maximum extent by pneumatic pressure, below the critical yielding-stress level for the membrane material, being the stress level at which the material yields inelastically. With this arrangement of radially broad ring-wall end face there is the additional advantage that substantial membrane vibration damping is provided.

It will be appreciated that when suction is applied through nipple 26 to the interior of chamber 13, membrane 12 is caused to deform from its initial extremely planar and uniformly tensioned condition and reflective surface 11 is formed into a concave mirror. The contact area of membrane 12 on ring wall 18 is very substantial which controls the stresses in the membrane during use of the mirror so that for a substantial range in f-number values of the reflective coating 11, down to F 0.5, the mirror has extremely good image forming qualities which are at least as good as can be achieved by conventional ground glass mirrors. The image forming qualities of the mirrors are dependent to some extent in the ability of the structure to produce a freedom from stress variation around the membrane 12 in the presence and in the absence of a deformation force applied to the membrane and this is facilitated by the tension control arrangement 30–33.

Monitoring of the membrane 12, in the presence of a deformation force, and adjustment of the tension control arrangement 30–33 to minimise and preferably eliminate stress variations may conveniently be undertaken by interferometry. For example by directing an expanded beam of laser radiation onto the membrane 12 and causing the reflected beam to be collimated and to impinge upon the front and rear surfaces of an optically flat surfaced plane-parallel sheet of transparent glass, interfering wave-fronts are established which form an interference fringe pattern. For a perfectly tensioned membrane 12 and a perfectly made sheet of glass this fringe pattern is then a series of parallel lines of uniform width. Adjustment of bolts 33 enables distorted fringe lines to be rendered straight and parallel and of uniform width by squeezing O-ring 30 at desired localities around the periphery of the membrane 12 in a fine tension control mode. Adjustment of bolts 22 provides coarse tension control over the entire surface area of the membrane and it is of course desirable that bolts 22 initially be set to provide the best attainable coarse tension control prior to setting of the fine tension control arrangement 30–33.

I claim:

1. A mirror assembly comprising a rigid circular structure (15) defining a hollow chamber (14) having a circular aperture (13), a flexible membrane (12) disposed across said circular aperture (13) and in contact with the periphery (18) of the circular aperture (13), said flexible membrane (12) having a reflective coating (11) adherent to the membrane face which is distal to said circular aperture (13), circularly-extending secural means (20) peripherally engaging said membrane (12) radially outwardly of said circular aperture (13) and capable of rendering flat that portion of the membrane (12) covering said circular aperture (13), pneumatic means (26) connected to said chamber (14) for varying the differential pneumatic pressure across the membrane (12) to thereby apply a pneumatic membrane deformation force to the membrane (12), said reflective coating (11) being rendered variable in focal length according to the magnitude of the applied deformation force, characterised in that said secural means (20) provides peripherally continuous clamping of the membrane (12) between opposed circularly-extending clamp surfaces (21, 24) at least one of which is mounted for movement axially of said circular structure (15) in order to effect rendering said membrane portion flat in the absence of any deformation force applied by said pneumatic means (26), and in that said secural means (20) also provides peripherally-discontinuous adjustment means (30–33) for adjusting tension in individual peripheral regions of said membrane portion, and stress control means (18A) are provided located at the interface between the circular structure (15) and the reflective coating (11) for controlling the stress distribution in the membrane (12) around the periphery of the circular aperture (13) when deformation force is applied by said pneumatic means (26).

2. A mirror assembly as claimed in claim 1, characterised in that the adjustment means (30–33) comprises an O-ring (30) overlying the membrane (12) and co-operating with a circular channel (31) and a segmented ring (32) engaging the O-ring (30), the individual segments of said ring (32) being independently adjustable to engage the O-ring (30) which squashes the membrane (12) into the channel (31).

3. A mirror assembly as claimed in claim 2, characterised in that the adjustment means (30–33) is carried by a ring (21) defining one of said axially movable clamp surfaces said ring (21) being resiliently mounted (22, 23) on said structure (15).

4. A mirror assembly as claimed in claim 3, characterised in that the mounting (22, 23) for said ring (21) is a three-point mounting provided by bolts (22) equi-angularly spaced around the periphery of the circular structure (15), springs (23) being provided between the ring (21) and the structure (15).

5. A mirror assembly as claimed in claim 2, characterised in that each ring segment is associated with two bolts (33) for adjusting that segment relative to the O-ring (30).

* * * * *